(12) United States Patent
Baghsorkhi et al.

(10) Patent No.: US 9,588,814 B2
(45) Date of Patent: Mar. 7, 2017

(54) FAST APPROXIMATE CONFLICT DETECTION

(71) Applicant: INTEL CORPORATION, Santa Clara, CA (US)

(72) Inventors: Sara S. Baghsorkhi, San Jose, CA (US); Albert Hartono, Santa Clara, CA (US); Youfeng Wu, Palo Alto, CA (US); Cheng Wang, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 14/582,430

(22) Filed: Dec. 24, 2014

(65) Prior Publication Data

US 2016/0188392 A1 Jun. 30, 2016

(51) Int. Cl.
| | |
|---|---|
| *G06F 7/02* | (2006.01) |
| *H03M 13/00* | (2006.01) |
| *G06F 9/50* | (2006.01) |
| *G06F 9/30* | (2006.01) |

(52) U.S. Cl.
CPC . *G06F 9/50* (2013.01); *G06F 9/30* (2013.01)

(58) Field of Classification Search
CPC ................................... G06F 9/50; G06F 9/30
See application file for complete search history.

(56) References Cited

U.S. PATENT DOCUMENTS

| | | | |
|---|---|---|---|
| 7,680,988 B1* | 3/2010 | Nickolls | G06F 12/084 711/130 |
| 8,108,625 B1* | 1/2012 | Coon | G06F 13/1663 711/127 |

* cited by examiner

*Primary Examiner* — Sam Rizk
(74) *Attorney, Agent, or Firm* — Grossman, Tucker, Perreault & Pfleger, PLLC

(57) ABSTRACT

The present disclosure is directed to fast approximate conflict detection. A device may comprise, for example, a memory, a processor and a fast conflict detection module (FCDM) to cause the processor to perform fast conflict detection. The FCDM may cause the processor to read a first and second vector from memory, and to then generate summaries based on the first and second vectors. The summaries may be, for example, shortened versions of write and read addresses in the first and second vectors. The FCDM may then cause the processor to distribute the summaries into first and second summary vectors, and may then determine potential conflicts between the first and second vectors by comparing the first and second summary vectors. The summaries may be distributed into the first and second summary vectors in a manner allowing all of the summaries to be compared to each other in one vector comparison transaction.

25 Claims, 4 Drawing Sheets

FAST APPROXIMATE CONFLICT DETECTION

TECHNICAL FIELD

The present disclosure relates to data processing, and more particularly, to a system for the fast approximation of potential conflicts that may exist between vectors prior to processing.

BACKGROUND

Existing computing devices typically perform scalar data processing. Scalar processors may operate on only one data object at a time, and thus, are single instruction, single data (SISD) processors. Vectorization is a single instruction, multiple data (SIMD) mode of data processing that may allow an instruction to operate on multiple data objects in parallel in a single processor core. SIMD processing offers advantages over SISD processing, especially in terms of the speed at which data may be processed. A substantial speed advantage may be realized by, for example, grouping data reads to be performed concurrently and doing the same for data writes. In at least one embodiment, the addresses corresponding to locations from which the data will be read, or to which the data will be written, may be consolidated into dynamic arrays or "vectors." Executing the data transactions in parallel is much faster than performing them serially. As a result, a fixed amount of processing capacity may be able to process a lot more information using vectorization.

While vectorization may be able to achieve substantial increases in processor throughput, the vectorization of general purpose applications may be limited due to dynamic cross-iteration dependencies and complex control flow. Conflicts may occur within a vector, between different vector elements, etc. For example, a conflict may arise in scenarios where in a sequence of instructions data is written to a location one or more times before a read occurs. In this instance, performing all reads and/or writes concurrently may result in a timing issue that causes the wrong data to be read. When potential conflicts in or between vectors occur infrequently, not using vectorization results in underutilization of hardware capacity. To enable the implementation of vectorization, systems are being developed to help determine potential conflicts between vector elements. While conflict detection systems may facilitate vectorization when no conflict is determined, and thus, to realize increased processing speed, any performance gain may be to some degree nullified by the burden imposed by conflict detection. In particular, existing conflict detection systems may provide high detection accuracy, but may slow the system with added data processing overhead.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
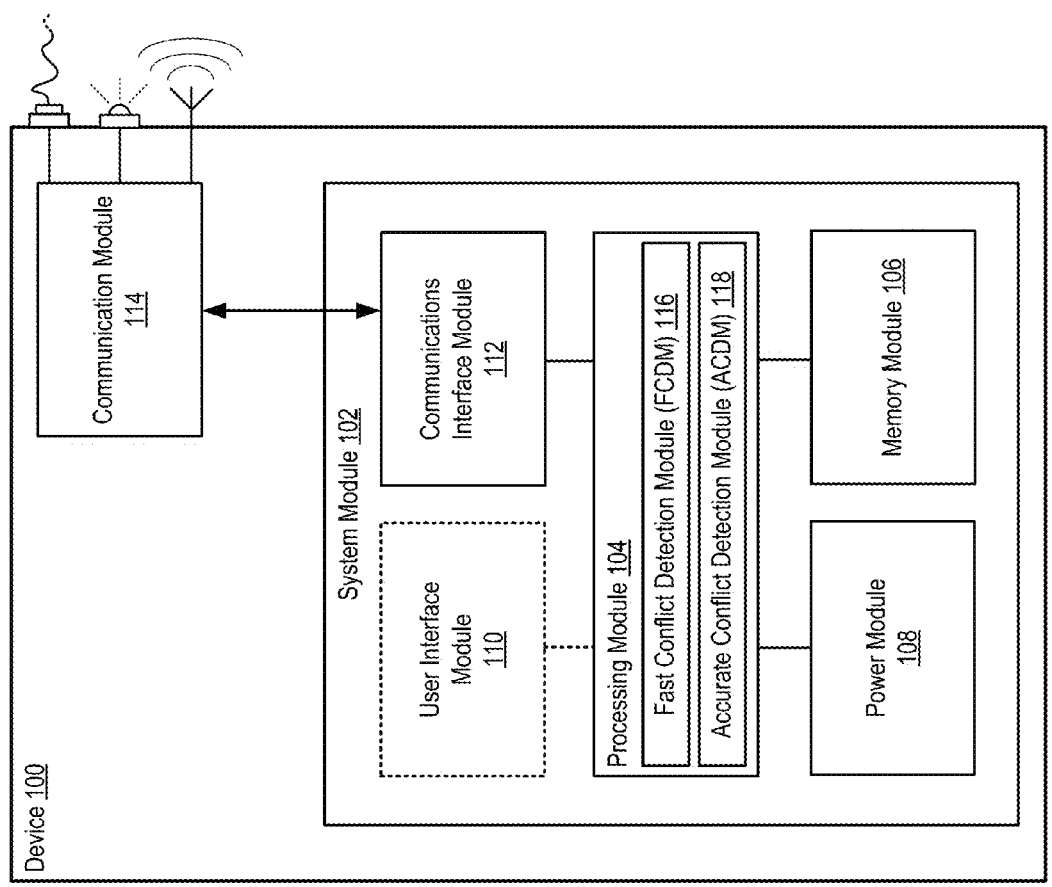
FIG. 1 illustrates an example device configured for fast approximate conflict detection in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to fast approximate conflict detection. A device may comprise, for example, a memory, a processor and a fast conflict detection module (FCDM) to cause the processor to perform fast conflict detection. The FCDM may cause the processor to read a first and second vector from memory, and to then generate summaries based on the first and second vectors. The summaries may be, for example, shortened versions of write and read addresses in the first and second vectors. The FCDM may then cause the processor to distribute the summaries into first and second summary vectors, and may then determine potential conflicts between the first and second vectors by comparing the first and second summary vectors. The summaries may be distributed into the first and second summary vectors in a manner allowing all of the summaries to be compared to each other in one vector comparison transaction. If potential conflicts are determined to exist, the FCDM may cause the processor to activate an accurate conflict detection module (ACDM) in the device to more accurately determine the conflicts.

In at least one embodiment, an example device configured for vectorization processing may comprise a memory module, a processing module and a FCDM. The FCDM may cause the processing module to read a first vector and a second vector from the memory, generate summaries based on the first and second vectors, and to distribute the summaries based on the first and second vectors into a first summary vector and a second summary vector, respectively. The FCDM may then cause the processing module to determine potential conflicts between the first and second vectors by comparing the first summary vector and the second summary vector.

In at least one embodiment, the first vector may comprise addresses from which data will be read during vectorization processing, and the second vector may comprise addresses to which data will be written during vectorization processing. For example, the summaries based on the first vector may comprise shortened versions of the addresses from which data will be read and the summaries based on the second vector may comprise shortened versions of the addresses to which data will be written. For example, the summaries based on the first and second vectors may comprise hashes of the addresses. The hashes of the addresses may be determined by performing an XOR between a lowest portion and a second lowest portion of each address.

In the same or a different embodiment, the processing module distributing the summaries may comprise the processing module placing the summaries based on the first and second vectors into locations in the first and second summary vectors, respectively, that allow each of the summaries based on the first and second vectors to be compared to each other using a single vector comparison. For example, the first and second summary vectors may be divided into blocks into which the summaries based on the first and second vectors are placed, each block in the first summary vector including one of the summaries of the first vector uniformly and each block in the second summary vector including each of the summaries of the second vector.

In the same or a different embodiment, the processing module may be to compare the first and second summary vectors using a compare mask to control which portions of the first and second summary vectors are compared. The device may further comprise an accurate conflict detection module to more accurately detect conflicts between the first and second vectors, wherein the fast detection conflict module is further to cause the processing module to activate the accurate conflict detection module based on potential conflicts determined between the first and second vectors. Consistent with the present disclosure, a method for fast approximate conflict detection may comprise causing a processor in a device to read a first vector and a second vector from a memory also in the device, causing the processor to generate summaries based on the first and second vectors, causing the processor to distribute the summaries of the first and second vectors into a first summary vector and a second summary vector, respectively, and causing the processor to determine potential conflicts between the first and second vectors by comparing the first summary vector and the second summary vector.

FIG. 1 illustrates an example device configured for fast approximate conflict detection in accordance with at least one embodiment of the present disclosure. Initially, various examples are presented herein for explaining various embodiments consistent with the present disclosure. Some of these examples may present example code or reference commands from instruction sets associated with a particular chipset. These examples have been presented merely for the sake of explanation, and are not meant to limit the various embodiments to a particular implementation. On the contrary, various types of equipment (e.g., processors, chipsets, etc.) and/or software (e.g. coding), existing now or in the future, may be employed consistent with the present disclosure.

Device 100 is presented herein as an example platform on which embodiments consistent with the present disclosure may be implemented. Device 100 may be, for example, a mobile communication device such as a cellular handset or a smartphone based on the Android® OS from the Google Corporation, iOS® from the Apple Corporation, Windows® OS from the Microsoft Corporation, Mac OS® from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Moreover, actual implementations may comprise more than one device 100. For example, a plurality of devices 100 may operate cooperatively in a parallel computing architecture. Regardless, device 100 is presented only for the sake of explanation, and is not meant to limit the various embodiments to any particular equipment for implementation.

Device 100 is illustrated in FIG. 1 as comprising at least modules 102 to 114. Modules 102 to 114 are presented herein merely for the sake of explanation. Any of modules 102 to 114 may be altered, omitted, etc. consistent with the present disclosure. System module 102 may be configured to manage operations in device 100 and may include processing module 104, memory module 106, power module 108, user interface module 110 and communication interface module 112. Device 100 may also include communication module 114. While communication module 114 has been shown as separate from system module 102, the example implementation disclosed in FIG. 1 has been provided merely for the sake of explanation. Some or all of the functionality associated with communication module 114 may be incorporated into system module 102.

In device 100, processing module 104 may comprise one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing module 104 may interact with other system components that may be operating at different speeds, on different buses, etc. in device 100. Some or all of the functionality commonly associated with the support circuitry may also be included in the same physical package as the processor (e.g., such as in the Sandy Bridge family of processors available from the Intel Corporation).

Processing module 104 may be configured to execute various instructions in device 100. Instructions may include program code configured to cause processing module 104 to perform activities related to reading data, writing data, processing data, formulating data, converting data, transforming data, etc. Information (e.g., instructions, data, etc.) may be stored in memory module 106. Memory module 106 may comprise random access memory (RAM) or read-only memory (ROM) in a fixed or removable format. RAM may include volatile memory configured to hold information during the operation of device 100 such as, for example, static RAM (SRAM) or Dynamic RAM (DRAM). ROM may include non-volatile (NV) memory modules configured based on BIOS, UEFI, etc. to provide instructions when device 100 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 108 may include internal power sources (e.g., a battery, fuel cell, etc.) and/or external power sources (e.g., electromechanical or solar generator, power grid, external fuel cell, etc.), and related circuitry configured to supply device 100 with the power needed to operate. User interface module 110 may include hardware and/or software to allow users to interact with device 100 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 110 may be incorporated within device 100 and/or may be coupled to device 100 via a wired or wireless communication medium. In at least one embodiment, user interface module 110 may be optional. For example, device 100 may be a server (e.g., in a server rack) that does not comprise a local user interface module 110, but instead relies upon a remote client to provide user interface functionality allowing an operator to interact with different rack servers.

Communication interface module 112 may be configured to manage packet routing and other control functions for communication module 114, which may include resources configured to support wired and/or wireless communications. In some instances, device 100 may comprise more than one communication module 114 (e.g., including separate physical interface modules for wired protocols and/or wireless radios) managed by a centralized communication interface module 112. Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 112 may be configured to prevent wireless communications that are active in communication module 114 from interfering with each other. In performing this function, communication interface module 112 may schedule activities for communication module 114 based on, for example, the relative priority of messages awaiting transmission. While the embodiment disclosed in FIG. 1 illustrates communication interface module 112 being separate from communication module 114, it may also be possible for the functionality of communication interface module 112 and communication module 114 to be incorporated within the same module.

Consistent with the present disclosure, processing module 104 may comprise FCDM 116 and ACDM 118. In at least one embodiment, modules 116 and/or 118 may include equipment in device 100 (e.g., processing module 104), the operation of which may be controlled by software loaded from memory module 106 (e.g., threads, processes, applications, etc.). FCDM 116 may be configured to perform a "fast check" for conflicts that may occur between two vectors (e.g., comprising write addresses and read addresses that may be accessed during vectorization). If no potential conflicts are detected then vectorization may proceed. If at least one potential conflict is detected, then FCDM 116 may cause processing module 104 to invoke ACDM 118. ACDM 118 may comprise a much more detailed, but also much more resource intensive, conflicts check to determine whether conflicts truly exist between vectors. ACDM 118 may comprise, but is not limited to, various high performance computing (HPC) systems capable of determining potential conflicts that may occur between vectors such as, for example, multiple instruction, multiple data (MIMD) applications.

Figure 2:
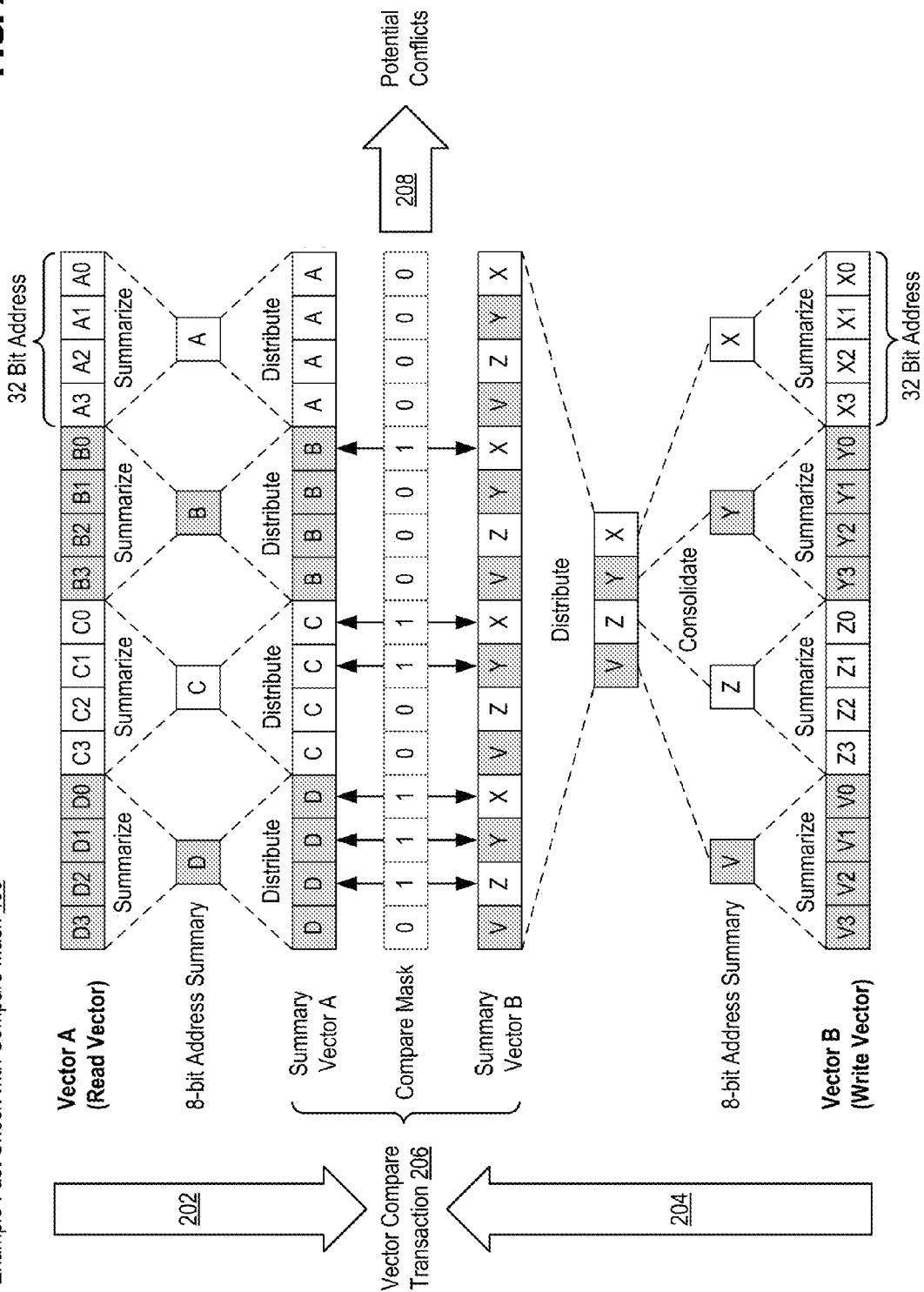
FIG. 2 illustrates an example of fast approximate conflict detection in accordance with at least one embodiment of the present disclosure.

FIG. 2 illustrates an example of fast approximate conflict detection in accordance with at least one embodiment of the present disclosure. Conflicts may occur within a vector or between two vectors. For example, the data at addresses in a vector may be accessed (e.g., read or written to) multiple times in the vector, and thus, each instance wherein an address is accessed may need to wait for a previous instance to complete so that the data read from an address reflects the results of the previous access instance. During vectorization the reads and writes may be reordered, and thus, any dependencies that exist may result in the generation of incorrect results.

Consistent with the present disclosure, an example implementation is disclosed in FIG. 2 to determine potential conflicts that may occur between vectors. While FIG. 2 discloses example vector A and vector B as having a certain size and containing a certain number of elements (e.g., as two arrays of four 32-bit addresses), these sizes/elements are not intended to limit the various embodiments of the present disclosure to a particular implementation, and are merely to provide a readily comprehensible context for discussing the various embodiments presented herein.

Example fast check 200 may be used to compare vector A, an array of 32 bit addresses from which data will be read, to vector B, an array of 32 bit addresses to which data will be written. Arrows 202 and 204 describe how to interpret the sequence of operations that may lead up to the generation of output 208 based on vector compare transaction 206. Vector A may comprise four 32-bit blocks making up read addresses, wherein each 32-bit block includes four 8-bit portions. In particular, portions A0, A1, A2 and A3 may make up a first address, portions B0, B1, B2 and B3 may make up a second address, portions C0, C1, C2 and C3 may make up a third address, and portions D0, D1, D2 and D3 may make up a fourth address. In a similar manner, vector B may comprise four 32-bit blocks making up write addresses, wherein each 32-bit block includes four 8-bit portions. In particular, portions X0, X1, X2 and X3 may make up a first address, portions Y0, Y1, Y2 and Y3 may make up a second address, portions Z0, Z1, Z2 and Z3 may make up a third address, and portions V0, V1, V2 and V3 may make up a fourth address. In at least one embodiment, example fast check 200 may begin with summarization. Summarization may be employed to shorten the length of values being compared in vector compare transaction 206 to decrease processing burden, and thus, increasing processing speed. Summarization may comprise any reformulation, derivation, computation, etc. that will result in shortened versions representing the 32-bit addresses in vectors A and B. For example the 32-bit addresses may be shortened to 8-bit summaries of each 32-bit address as represented in FIG. 2 by summaries A, B, C and D corresponding to vector A and summaries X, Y, Z and V corresponding to vector B. An example of summarization, consistent with the present disclosure, is illustrated further in FIG. 3.

In at least one embodiment, an objective of summarization may be to generate shortened versions of all of the addresses in both vectors A and B so that the shortened versions in vectors A and B may be compared to the shortened versions representing addresses in vector B within a single vector compare transaction 206. A "distribution" operation may facilitate this comparison. While a variety of distribution methodologies may be employed, example operations consistent with the present disclosure are shown in example fast check 200. For example, summaries A, B, C and D representing addresses in vector A may be distributed in summary vector A so that each block within summary vector A comprises one of the summaries (e.g., the first block comprises, "A, A, A, A," the second block "B, B, B, B," etc.). For vector B, at least two operations may occur during distribution. Summaries X, Y, Z and V may initially be consolidated, and then the consolidated summaries may be distributed into summary vector B so that each block includes each of the summaries X, Y, Z and V as shown in FIG. 2.

In at least one embodiment, a compare mask may indicate the summaries in each block of summary vectors A and B to be compared. For example, a "1" in the compare mask indicates a comparison that needs to be made, while a "0" indicates a comparison that may be skipped. The exclusion of certain summaries in each block may be based on the principle that when certain addresses are being written to they only affect reads that chronologically occur after them, and thus, there is no need to compare them to the address of reads that have already happened before them. For example, in the second block the address corresponding to summary B should have already been read from after the data from the address corresponding to address X may be written to, and thus, there is a need to compare these summaries (e.g., but not for the other three write summaries: V, Z, Y, since the reads from B happen before the three writes). The compare mask may also disable corresponding comparisons for a read or write that did not occur in a vector iteration, in case loads and stores are conditionally executed. A result of comparison 206 is shown at 208, wherein potential conflicts that may exist between vectors A and B, based on the comparison of summary vectors A and B, are determined. For example, FCDM 116 may employ result 208 to call ACDM 118 to perform more accurate conflict determination operations on vectors A and B.

Figure 3:
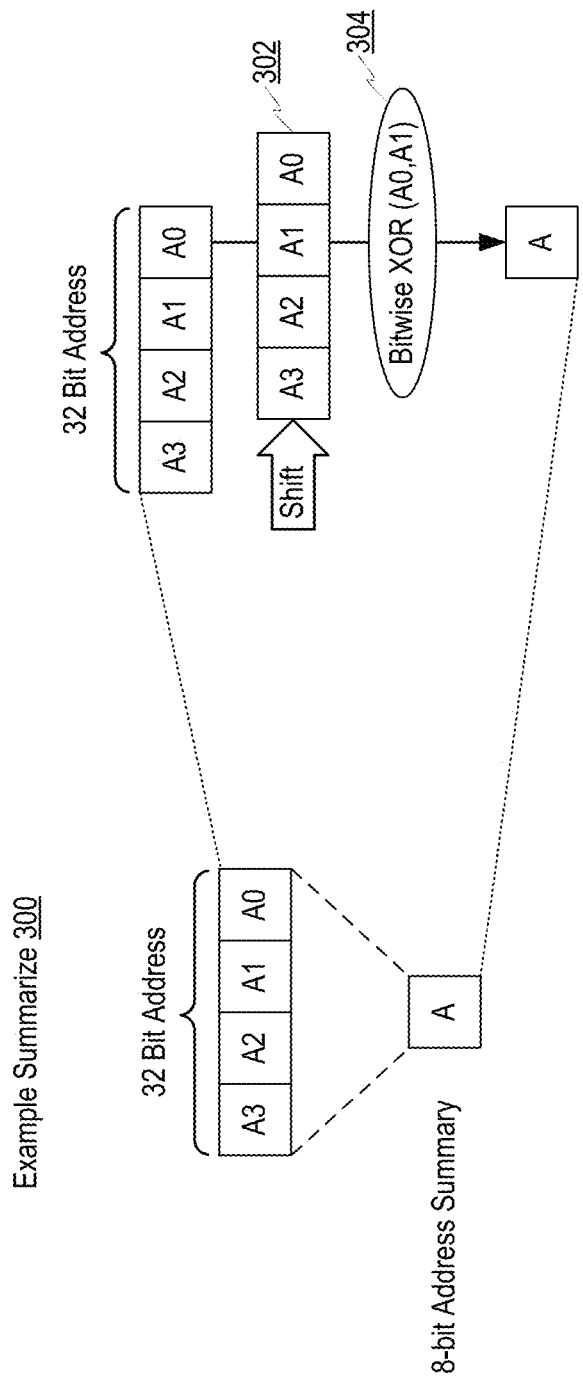
FIG. 3 illustrates an example of summarization based on a first vector in accordance with at least one embodiment of the present disclosure.

FIG. 3 illustrates an example of summarization based on a first vector in accordance with at least one embodiment of the present disclosure. Summarize operation 300 may comprise, for example, executing a hash operation on each 32 bit address in vector A to yield an 8-bit address summary. For example, the 32-bit address comprising A0, A1, A2 and A3 may be "shifted" as shown at 302. As shown at 304, a bitwise exclusive OR (XOR) may be performed to generate the hash (e.g., the 8-bit address summary). In particular, A0 (e.g., the lowest 8-bit portion of the 32-bit address) may be XORed with A1 (e.g., the second lowest portion of the 32-bit address).

Example pseudocode that may be employed to implement example fast check operation 200 and/or example summarize operation 300 is presented below. The following pseudocode is presented only for the sake of example, and is not intended to limit the embodiments consistent with the present disclosure to any particular manner of implementation. Comments enclosed in "/*" and "*/" are provided below to explain the purpose of the code segments in the pseudocode.

```
/*Hash read addresses/indices */
vb_shr = _mm512_srli_epi32(vb, 8);
vb_hash = _mm512_xor_epi32(vb, vb_shr);
/*Hash write addresses/indices*/
va_shr = _mm512_srli_epi32(va, 8);
va_hash = _mm512_xor_epi32(va, va_shr);
/*Within each 32 bits, duplicate hash values computed in the lower 8 bits into the other
three upper neighboring 8 bits*/
va_hash = _mm512_shuffle_epi8(va_hash, vshuf_a);
/*For each four 32 bit elements, consolidate the lower 8 bit hash values into the least
significant element*/
vb_hash = _mm512_shuffle_epi8(vb_hash, vshuf_b);
/*distribute the least significant double word (32 bits) within each 128 bits to be
compared with read hash values*/
vb_hash_tmp = _mm512_selectlast_epi32(0x1, vb_hash);
/* If any of read hash values match with hash values corresponding to its earlier writes set
a flag, otherwise continue with the next batch */
    k1 = _mm512_mask_cmpeq_epi8_mask(0xffffffffffff7310, vb_hash_tmp, va_hash);
        if(k1){
            flag = 1;
            goto done;
        }
/* The above pseudocode was formulated to handle a vector length of four, which needs
only one selectlast/cmpeq. For a vector length of eight, the selectlast/cmpeq sequence needs to
be repeated twice, for a vector length sixteen the sequence needs to be repeated four times, etc.*/
    vb_hash_tmp1 =_mm512_selectlast_epi32(0x10, vb_hash);
    k2 = _mm512_mask_cmpeq_epi8_mask(0xffffffff73100000, vb_hash_tmp1, va_hash);
    if(k2){
        flag = 1;
        goto done;
    }
    vb_hash_tmp2 = _mm512_selectlast_epi32(0x100, vb_hash);
    k3 = _mm512_mask_cmpeq_epi8_mask(0xffff731000000000, vb_hash_tmp2, va_hash);
    if(k3){
        flag = 1;
        goto done;
    }
    vb_hash_tmp3 = _mm512_selectlast_epi32(0x1000, vb_hash);
    k4 = _mm512_mask_cmpeq_epi8_mask(0x7310000000000000, vb_hash_tmp3,
va_hash);
        if(k4)
            flag = 1;
    done:
        return flag;
```

In at least one embodiment, the accuracy of determining potential conflicts provided by the operations disclosed in example 200 may be lower than the accuracy provided by the various systems that may be employed by ACDM 118, but through the combined utilization of FCDM 116 and ACDM 118 substantially faster execution may be realized without any false negatives (e.g., without an incorrect indication that no conflicts exist between two vectors when conflicts actually exist). In a worst case scenario the fast check approximation that is provided by FCDM 116 may over-predict the existence of conflicts. However, it will also not incorrectly predict the lack of conflicts, which means that in situations where no conflicts are determined to exist, the overall speed of data processing may be substantially faster than a solution that always is required to employ high precision conflict detection. In an least one implementation, the fast check approximation has been observed to provide about a 45% faster determination than a high precision hardware-implemented two operand conflict detection solution, and approximately 3.84 times faster performance than software systems providing high precision conflict detection.

Figure 4:
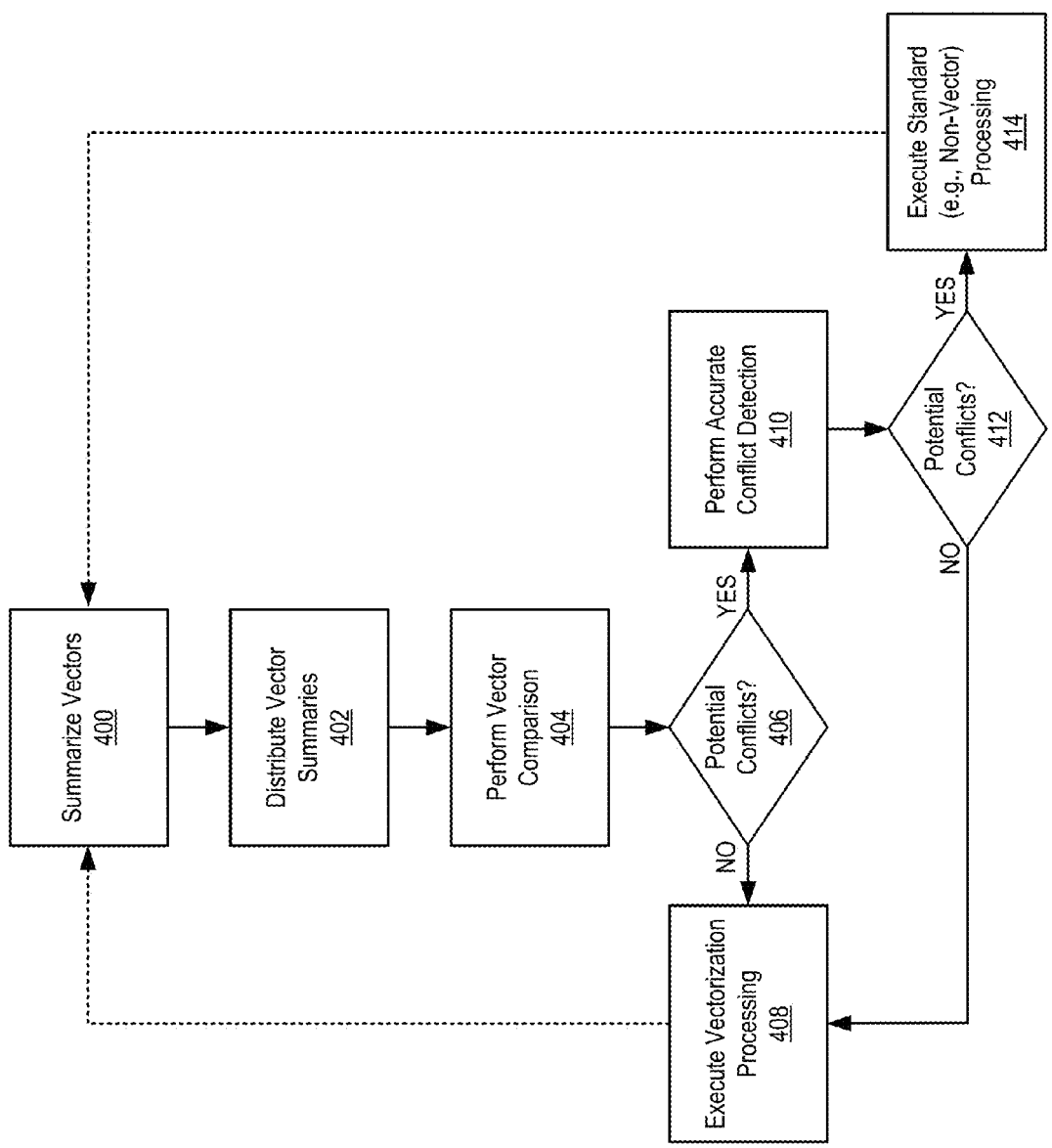
FIG. 4 illustrates example operations for fast approximate conflict detection in accordance with at least one embodiment of the present disclosure.

FIG. 4 illustrates example operations for fast approximate conflict detection in accordance with at least one embodiment of the present disclosure. In operation 400 vectors to be compared may be summarized. Summarization may include determining summaries based on the vectors (e.g., based on data within the vectors such as addresses to which data will be written or from which data will be read). The vector summaries may then be distributed into summary vectors in operation 402. Distribution may comprise, for example, placing the vector summaries into locations within the summary vectors so that all of the summaries may be compared to each other in a single vector comparison transaction. The summary vectors may then be compared in a vector comparison transaction in operation 404 to, for example, determine potential conflicts.

A determination may then be made in operation 406 as to whether any potential conflicts were determined to exist between the vectors (e.g., based on the vector comparison transaction). If in operation 406 it is determined that no potential conflicts exist, then vectorization processing may be executed in operation 408, which may be followed by an optional return to operation 400 to prepare for the next vector conflict determination. If in operation 406 it potential conflicts are determined, then in operation 410 accurate conflict detection may be performed. For example, a high precision conflict detection system may determine potential conflicts between the vectors. A determination may then be made in operation 412 as to whether potential conflicts exist based on the accurate conflict detection. If in operation 412 no conflicts are determined to exist, then in operation 408 vectorization processing may continue. If in operation 412 it is confirmed that potential conflicts exist between the vectors, then in operation 414 standard (e.g., non-vector or more conservative vector) processing may be executed, which may then be followed by an optional return to operation 400 to prepare for the next vector conflict determination.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to fast approximate conflict detection. A device may comprise, for example, a memory, a processor and a fast conflict detection module (FCDM) to cause the processor to perform fast conflict detection. The FCDM may cause the processor to read a first and second vector from memory, and to then generate summaries based on the first and second vectors. The summaries may be, for example, shortened versions of write and read addresses in the first and second vectors. The FCDM may then cause the processor to distribute the summaries into first and second summary vectors, and may then determine potential conflicts between the first and second vectors by comparing the first and second summary vectors. The summaries may be distributed into the first and second summary vectors in a manner allowing all of the summaries to be compared to each other in one vector comparison transaction.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for fast approximate conflict detection, as provided below.

According to example 1 there is provided a device configured for vectorization processing. The device may comprise a memory module, a processing module and a fast conflict detection module to cause the processing module to read a first vector and a second vector from the memory, generate summaries based on the first and second vectors, distribute the summaries based on the first and second vectors into a first summary vector and a second summary vector, respectively, and determine potential conflicts between the first and second vectors by comparing the first summary vector and the second summary vector.

Example 2 may include the elements of example 1, wherein the first vector comprises addresses from which data will be read during vectorization processing, and the second vector comprises addresses to which data will be written during vectorization processing.

Example 3 may include the elements of example 2, wherein the summaries based on the first vector comprise shortened versions of the addresses from which data will be read and the summaries based on the second vector comprise shortened versions of the addresses to which data will be written.

Example 4 may include the elements of any of examples 2 to 3, wherein the addresses are 32-bit addresses.

Example 5 may include the elements of any of examples 2 to 4, wherein the summaries based on the first and second vectors comprise hashes of the addresses.

Example 6 may include the elements of example 5, wherein the hashes of the addresses are determined by performing an XOR between a lowest portion and a second lowest portion of each address.

Example 7 may include the elements of any of examples 2 to 6, wherein the summaries based on the first and second vectors comprise hashes of the addresses determined by performing an XOR between a lowest portion and a second lowest portion of each address.

Example 8 may include the elements of any of examples 1 to 7, wherein the processing module distributing the summaries comprises the processing module placing the summaries based on the first and second vectors into locations in the first and second summary vectors, respectively, that allow each of the summaries based on the first and second vectors to be compared to each other using a single vector comparison.

Example 9 may include the elements of example 8, wherein the first and second summary vectors are divided into blocks into which the summaries based on the first and second vectors are placed, each block in the first summary vector including one of the summaries of the first vector uniformly and each block in the second summary vector including each of the summaries of the second vector.

Example 10 may include the elements of any of examples 1 to 9, wherein the processing module is to compare the first and second summary vectors using a compare mask to control which portions of the first and second summary vectors are compared.

Example 11 may include the elements of any of examples 1 to 10, and may further comprise an accurate conflict detection module to more accurately detect conflicts between the first and second vectors, wherein the fast detection conflict module is further to cause the processing module to activate the accurate conflict detection module based on potential conflicts determined between the first and second vectors.

Example 12 may include the elements of example 11, wherein the accurate conflict detection module is based on a multiple instruction, multiple data (MIMD) application.

Example 13 may include the elements of any of examples 1 to 12, wherein the summaries based on the first vector comprise shortened versions of addresses from which data will be read and the summaries based on the second vector comprise shortened versions of addresses to which data will be written.

According to example 14 there is provided a method for fast approximate conflict detection. The method may comprise causing a processing module in a device to read a first vector and a second vector from a memory module also in the device, causing the processing module to generate summaries based on the first and second vectors, causing the processing module to distribute the summaries of the first and second vectors into a first summary vector and a second summary vector, respectively and causing the processing module to determine potential conflicts between the first and second vectors by comparing the first summary vector and the second summary vector.

Example 15 may include the elements of example 14, wherein the first vector comprises addresses from which data will be read during vectorization processing, and the second vector comprises addresses to which data will be written during vectorization processing.

Example 16 may include the elements of example 15, wherein the summaries based on the first vector comprise shortened versions of the addresses from which data will be read and the summaries based on the second vector comprise shortened versions of the addresses to which data will be written.

Example 17 may include the elements of any of examples 15 to 16, wherein the addresses are 32-bit addresses.

Example 18 may include the elements of any of examples 15 to 17, wherein the summaries based on the first and second vectors comprise hashes of the addresses.

Example 19 may include the elements of example 18, wherein the hashes of the addresses are determined by performing an XOR between a lowest portion and a second lowest portion of each address.

Example 20 may include the elements of any of examples 14 to 19, wherein distributing the summaries comprises placing the summaries based on the first and second vectors into locations in the first and second summary vectors, respectively, that allow each of the summaries based on the first and second vectors to be compared to each other using a single vector comparison.

Example 21 may include the elements of example 20, wherein the first and second summary vectors are divided into blocks into which the summaries based on the first and second vectors are placed, each block in the first summary vector including one of the summaries of the first vector uniformly and each block in the second summary vector including each of the summaries of the second vector.

Example 22 may include the elements of any of examples 14 to 21, wherein comparing the first and second summary vectors comprises using a compare mask to control which portions of the first and second summary vectors are compared.

Example 23 may include the elements of any of examples 14 to 22, and may further comprise causing the processing module to activate an accurate conflict detection module to more accurately detect conflicts between the first and second vectors based on potential conflicts determined between the first vector and the second vector.

Example 24 may include the elements of example 23, wherein the accurate conflict detection module is based on a multiple instruction, multiple data (MIMD) application.

Example 25 may include the elements of any of examples 14 to 24, wherein the summaries based on the first vector comprise shortened versions of addresses from which data will be read and the summaries based on the second vector comprise shortened versions of addresses to which data will be written.

According to example 26 there is provided a system for fast approximate conflict detection including at least a device, the system being arranged to perform the method of any of the above examples 14 to 25.

According to example 27 there is provided a chipset arranged to perform the method of any of the above examples 14 to 25.

According to example 28 there is provided at least one machine readable medium comprising a plurality of instructions that, in response to be being executed on a computing device, cause the computing device to carry out the method according to any of the above examples 14 to 25.

According to example 29 there is provided a device configured for fast approximate conflict detection, the device being arranged to perform the method of any of the above examples 14 to 25.

According to example 30 there is provided a system for fast approximate conflict detection. The system may comprise means for reading a first vector and a second vector from a memory in a device, means for generating summaries based on the first and second vectors, means for distributing the summaries of the first and second vectors into a first summary vector and a second summary vector, respectively, and means for determining potential conflicts between the first and second vectors by comparing the first summary vector and the second summary vector.

Example 31 may include the elements of example 30, wherein the first vector comprises addresses from which data will be read during vectorization processing, and the second vector comprises addresses to which data will be written during vectorization processing.

Example 32 may include the elements of example 31, wherein the summaries based on the first vector comprise shortened versions of the addresses from which data will be read and the summaries based on the second vector comprise shortened versions of the addresses to which data will be written.

Example 33 may include the elements of any of examples 31 to 32, wherein the addresses are 32-bit addresses.

Example 34 may include the elements of any of examples 31 to 33, wherein the summaries based on the first and second vectors comprise hashes of the addresses.

Example 35 may include the elements of example 34, wherein the hashes of the addresses are determined by performing an XOR between a lowest portion and a second lowest portion of each address.

Example 36 may include the elements of any of examples 30 to 35, wherein the means for distributing the summaries comprise means for placing the summaries based on the first and second vectors into locations in the first and second summary vectors, respectively, that allow each of the summaries based on the first and second vectors to be compared to each other using a single vector comparison.

Example 37 may include the elements of example 36, wherein the first and second summary vectors are divided into blocks into which the summaries based on the first and second vectors are placed, each block in the first summary vector including one of the summaries of the first vector uniformly and each block in the second summary vector including each of the summaries of the second vector.

Example 38 may include the elements of any of examples 30 to 37, wherein the means for comparing the first and second summary vectors comprise means for using a compare mask to control which portions of the first and second summary vectors are compared.

Example 39 may include the elements of any of examples 30 to 38, and may further comprise means for activating an accurate conflict detection module to more accurately detect conflicts between the first and second vectors based on potential conflicts determined between the first vector and the second vector.

Example 40 may include the elements of example 39, wherein the accurate conflict detection module is based on a multiple instruction, multiple data (MIMD) application.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device configured for vectorization processing, comprising:
    a memory module;
    a processing module; and
    a fast conflict detection module to cause the processing module to:
        read a first vector and a second vector from the memory;
        generate summaries based on the first and second vectors;
        distribute the summaries based on the first and second vectors into a first summary vector and a second summary vector, respectively; and
        determine potential conflicts between the first and second vectors by comparing the first summary vector and the second summary vector.

2. The device of claim 1, wherein the first vector comprises addresses from which data will be read during vectorization processing, and the second vector comprises addresses to which data will be written during vectorization processing.

3. The device of claim 2, wherein the summaries based on the first vector comprise shortened versions of the addresses from which data will be read and the summaries based on the second vector comprise shortened versions of the addresses to which data will be written.

4. The device of claim 2, wherein the summaries based on the first and second vectors comprise hashes of the addresses.

5. The device of claim 4, wherein the hashes of the addresses are determined by performing an XOR between a lowest portion and a second lowest portion of each address.

6. The device of claim 1, wherein the processing module distributing the summaries comprises the processing module placing the summaries based on the first and second vectors into locations in the first and second summary vectors, respectively, that allow each of the summaries based on the first and second vectors to be compared to each other using a single vector comparison.

7. The device of claim 6, wherein the first and second summary vectors are divided into blocks into which the summaries based on the first and second vectors are placed, each block in the first summary vector including one of the summaries of the first vector uniformly and each block in the second summary vector including each of the summaries of the second vector.

8. The device of claim 1, wherein the processing module is to compare the first and second summary vectors using a compare mask to control which portions of the first and second summary vectors are compared.

9. The device of claim 1, further comprising an accurate conflict detection module to more accurately detect conflicts between the first and second vectors, wherein the fast detection conflict module is further to cause the processing module to activate the accurate conflict detection module based on potential conflicts determined between the first and second vectors.

10. A method for fast approximate conflict detection, comprising:
causing a processing module in a device to read a first vector and a second vector from a memory module also in the device;
causing the processing module to generate summaries based on the first and second vectors;
causing the processing module to distribute the summaries of the first and second vectors into a first summary vector and a second summary vector, respectively; and
causing the processing module to determine potential conflicts between the first and second vectors by comparing the first summary vector and the second summary vector.

11. The method of claim 10, wherein the first vector comprises addresses from which data will be read during vectorization processing, and the second vector comprises addresses to which data will be written during vectorization processing.

12. The method of claim 11, wherein the summaries based on the first vector comprise shortened versions of the addresses from which data will be read and the summaries based on the second vector comprise shortened versions of the addresses to which data will be written.

13. The method of claim 11, wherein the summaries based on the first and second vectors comprise hashes of the addresses.

14. The method of claim 10, wherein distributing the summaries comprises placing the summaries based on the first and second vectors into locations in the first and second summary vectors, respectively, that allow each of the summaries based on the first and second vectors to be compared to each other using a single vector comparison.

15. The method of claim 14, wherein the first and second summary vectors are divided into blocks into which the summaries based on the first and second vectors are placed, each block in the first summary vector including one of the summaries of the first vector uniformly and each block in the second summary vector including each of the summaries of the second vector.

16. The method of claim 10, wherein comparing the first and second summary vectors comprises using a compare mask to control which portions of the first and second summary vectors are compared.

17. The method of claim 10, further comprising:
causing the processing module to activate an accurate conflict detection module to more accurately detect conflicts between the first and second vectors based on potential conflicts determined between the first vector and the second vector.

18. A non-transitory machine-readable storage medium having stored thereon, individually or in combination, instructions for fast approximate conflict detection that, when executed by one or more processors, cause the one or more processors to:
read a first vector and a second vector from a memory in a device;
generate summaries based on the first and second vectors;
distribute the summaries of the first and second vectors into a first summary vector and a second summary vector, respectively; and
determine potential conflicts between the first and second vectors by comparing the first summary vector and the second summary vector.

19. The non-transitory machine-readable storage medium of claim 18, wherein the first vector comprises addresses from which data will be read during vectorization processing, and the second vector comprises addresses to which data will be written during vectorization processing.

20. The non-transitory machine-readable storage medium of claim 19, wherein the summaries based on the first vector comprise shortened versions of the addresses from which data will be read and the summaries based on the second vector comprise shortened versions of the addresses to which data will be written.

21. The non-transitory machine-readable storage medium of claim 19, wherein the summaries based on the first and second vectors comprise hashes of the addresses.

22. The non-transitory machine-readable storage medium of claim 18, wherein the instructions to distribute the summaries comprises instructions to place the summaries based on the first and second vectors into locations in the first and second summary vectors, respectively, that allow each of the summaries based on the first and second vectors to be compared to each other using a single vector comparison.

23. The non-transitory machine-readable storage medium of claim 22, wherein the first and second summary vectors are divided into blocks into which the summaries based on the first and second vectors are placed, each block in the first summary vector including one of the summaries of the first vector uniformly and each block in the second summary vector including each of the summaries of the second vector.

24. The non-transitory machine-readable storage medium of claim 18, wherein the instructions to compare the first and second summary vectors comprise instructions to use a compare mask to control which portions of the first and second summary vectors are compared.

25. The non-transitory machine-readable storage medium of claim 18, further comprising instructions that, when executed by one or more processors, cause the one or more processors to:
activate an accurate conflict detection module to more accurately detect conflicts between the first and second vectors based on potential conflicts determined between the first vector and the second vector.

* * * * *